(12) United States Patent
Beppu et al.

(10) Patent No.: US 11,724,636 B2
(45) Date of Patent: Aug. 15, 2023

(54) COMBINED RADAR AND LIGHTING UNIT AND LASER RADAR APPARATUS

(71) Applicant: DENSO CORPORATION, Kariya (JP)

(72) Inventors: Taro Beppu, Kariya (JP); Naoki Yoshimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/318,844

(22) Filed: May 12, 2021

(65) Prior Publication Data

US 2021/0261044 A1 Aug. 26, 2021

Related U.S. Application Data

(63) Continuation of application No. PCT/JP2019/043030, filed on Nov. 1, 2019.

(30) Foreign Application Priority Data

Nov. 14, 2018 (JP) .................................. 2018-213933

(51) Int. Cl.
*B60Q 1/00* (2006.01)
*G01S 17/86* (2020.01)
*B60Q 1/14* (2006.01)
*F21S 41/162* (2018.01)

(52) U.S. Cl.
CPC .......... *B60Q 1/0023* (2013.01); *B60Q 1/143* (2013.01); *G01S 17/86* (2020.01); *B60Q 2300/45* (2013.01); *B60Y 2400/301* (2013.01); *F21S 41/162* (2018.01)

(58) Field of Classification Search
CPC ........... B60Q 2300/41; B60Q 2300/42; B60Q 1/0023; B60Q 1/143
See application file for complete search history.

(56) References Cited

U.S. PATENT DOCUMENTS

| | | | |
|---|---|---|---|
| 2013/0314711 A1* | 11/2013 | Cantin | B60Q 1/0023 356/445 |
| 2018/0229645 A1 | 8/2018 | Hara et al. | |
| 2020/0174100 A1* | 6/2020 | Hori | F21S 45/47 |
| 2021/0403015 A1* | 12/2021 | Kato | B60W 60/001 |

FOREIGN PATENT DOCUMENTS

| | | |
|---|---|---|
| JP | 4-315086 A | 11/1992 |
| JP | 5-27037 A | 2/1993 |
| JP | H06-294870 A | 10/1994 |
| JP | 2005-164482 A | 6/2005 |
| WO | 2019/026438 A1 | 2/2019 |

* cited by examiner

*Primary Examiner* — Wei (Victor) Y Chan
(74) *Attorney, Agent, or Firm* — Maschoff Brennan

(57) ABSTRACT

A combined radar and lighting unit includes a laser radar apparatus, a lighting device, and a controller. The laser radar apparatus is mounted to a vehicle, emits laser light toward an outside of the vehicle, and detects reflected light. The lighting device is mounted to the vehicle and emits visible light toward the outside of the vehicle. The controller controls the lighting device to cause the lighting device to alternately operate in a first emission mode to perform emission of the visible light, and in a second emission mode to stop emission of the visible light or reduce a quantity of the visible light. The controller controls the laser radar apparatus to interrupt the measurement of the distance while the lighting device is operating in the first emission mode, and executes the measurement of the distance while the lighting device is operating in the second emission mode.

3 Claims, 7 Drawing Sheets

COMBINED RADAR AND LIGHTING UNIT AND LASER RADAR APPARATUS

CROSS-REFERENCE TO RELATED APPLICATION

This application is a bypass continuation application of currently pending international application No. PCT/JP2019/43030 filed on Nov. 1, 2019 designating the United States of America, the entire disclosure of which is incorporated herein by reference.

This application is based on and claims the benefit of priority from Japanese Patent Application No. 2018-213933 filed on Nov. 14, 2018, the entire disclosure of which is incorporated herein by reference.

TECHNICAL FIELD

The present disclosure relates to combined radar and lighting units and laser radar apparatuses.

BACKGROUND

A typical combined radar and lighting unit is mounted to the front portion of a vehicle, and is equipped with a laser radar apparatus and a lighting apparatus.

SUMMARY

The present disclosure aims to improve the detection ability of a laser radar apparatus.

A laser radar apparatus according to an aspect of the present disclosure includes a controller configured to (1) Control a lighting device to cause the lighting device to alternately operate in a first emission mode to perform emission of visible light, and in a second emission mode to stop emission of the visible light or reduce a quantity of the visible light (2) Control a laser radar apparatus to (i) interrupt a measurement of a distance while the lighting device is operating in the first emission mode, and (ii) execute the measurement of the distance while the lighting device is operating in the second emission mode

DETAILED DESCRIPTION OF EMBODIMENT

Figure 1:
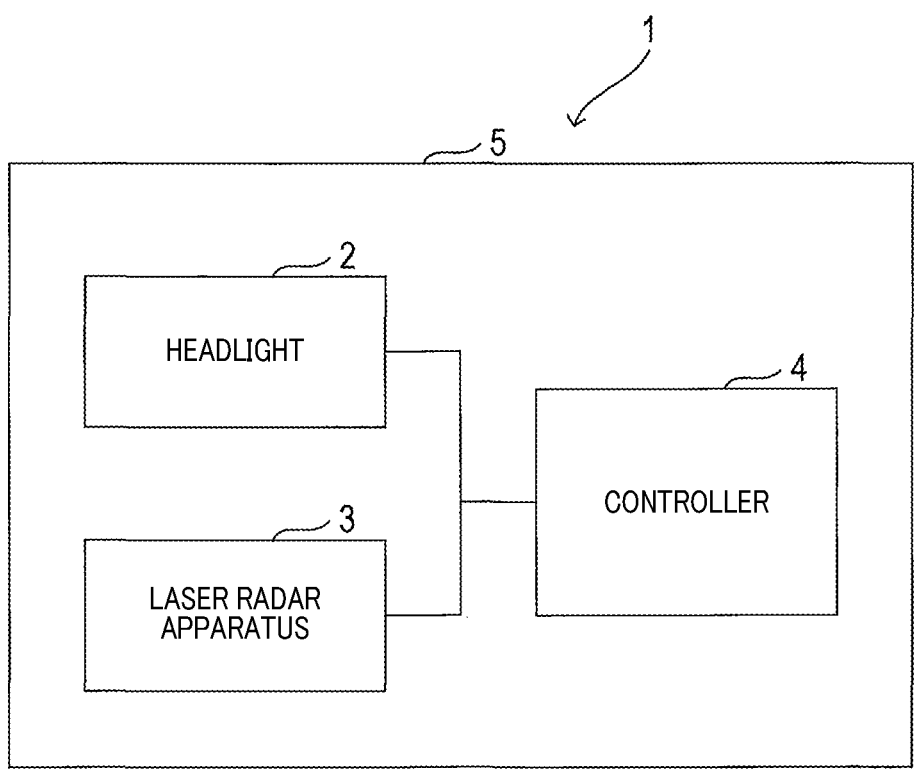
FIG. 1 is a block diagram illustrating a configuration of a combined radar and lighting unit according to the first embodiment.

Japanese Patent Application Publication No. H06-294870 discloses a combined radar and lighting unit mounted to the front portion of a vehicle and equipped with a laser radar apparatus and a lighting apparatus.

The inventors of the present disclosure have studied in detail the combined radar and lighting unit disclosed in the patent publication to accordingly have found a problem that light irradiated from the lighting apparatus toward the forward direction of the vehicle acts as noise and reduces the detection ability of the laser radar apparatus.

The present disclosure aims to improve the detection ability of a laser radar apparatus.

The present disclosure provides a combined radar and lighting unit according to a first aspect. The combined radar and lighting unit according to the first aspect includes a laser radar apparatus, a lighting device, and a controller.

The laser radar apparatus is mounted to a vehicle and is configured to emit laser light toward an outside of the vehicle, and detect reflected light resulting from reflection of the emitted laser light by an object to accordingly perform at least measurement of a distance of the object.

The lighting device is mounted to the vehicle and is configured to emit visible light toward the outside of the vehicle for illuminating surroundings of the vehicle The controller is configured to control the lighting device to cause the lighting device to alternately operate in a first emission mode to perform emission of the visible light, and in a second emission mode to stop emission of the visible light or reduce a quantity of the visible light. The controller is configured to control the laser radar apparatus to (i) interrupt the measurement of the distance while the lighting device is operating in the first emission mode, and (ii) execute the measurement of the distance while the lighting device is operating in the second emission mode.

The combined radar and lighting unit of the first aspect configured set forth above is configured to cause the lighting device to operate alternately in the first emission mode and the second emission mode. Adjusting a first duration of the lighting device operating in the first emission mode and a second duration of the lighting device operating in the second emission mode enable the driver's sight toward the direction in which the visible light is emitted to be ensured. In particular, the combined radar and lighting unit of the first aspect is configured to control the laser radar apparatus to interrupt execution of the measurement of the distance while the lighting device is performing emission of the visible light in the first emission mode, and execute the measurement of the distance while the lighting device is stopping emission of the visible light in the second emission mode.

This configuration therefore enables the laser radar apparatus to execute measurement of the distance while influence of the visible light irradiated from the lighting device is reduced, making it possible to improve the detection performance of the laser radar apparatus.

The present disclosure provides a laser radar apparatus according to a second aspect. The laser radar apparatus includes a light scanning unit, a light detector, a measuring unit, a region determiner, and a threshold setting unit.

The light scanning unit is mounted to a vehicle and is configured to output laser light toward an outside of the vehicle while scanning the laser light in a laser-light irradiation region. The laser-light scanning region is comprised of a plurality of segments. The light detector is configured to perform detection of reflected light resulting from reflection of the scanned laser light.

The measuring unit is configured to, upon determination that an object that reflected at least the scanned laser light is detected based on a detection threshold, measure, based on information resulting from the detection of the reflected light, at least a distance to the object that reflected at least the scanned laser light.

The region determiner is configured to determine whether at least one segment in the laser-light irradiation region is overlapped with a visible-light irradiation region, the visible-light irradiation region being a region irradiated by visible light emitted from a lighting device for illuminating surroundings of the vehicle, the lighting device being mounted to the vehicle.

The threshold setting unit is configured to set, upon determination that the at least one segment in the laser-light irradiation region is overlapped with the visible-light irradiation region, the detection threshold to be higher than determination that the at least one segment in the laser-light irradiation region is not overlapped with the visible-light irradiation region.

The laser radar apparatus is configured to
1. Set the detection threshold to be higher upon determination that there is a high possibility that the laser radar apparatus detects reflected visible light resulting from reflection of the visible light emitted from the lighting device by an object
2. Set the detection threshold to be lower upon determination that there is a low possibility that the laser radar apparatus detects reflected visible light resulting from reflection of the visible light emitted from the lighting device by an object This configuration therefore reduces a risk that the laser radar apparatus may determine, when detecting reflected visible light resulting from reflection of the emitted visible light by an object, the object as a target object that reflected the emitted laser light. This therefore results in improvement of the object detection ability of the laser radar apparatus.

The present disclosure provides a combined radar and lighting unit according to a third aspect. The combined radar and lighting unit of the third aspect includes a laser radar apparatus mounted to a vehicle, and a lighting device mounted to the vehicle.

The laser radar apparatus is configured to emit, toward an outside of the vehicle, laser light having a wavelength of not less than 1000 nanometers, and detect reflected light resulting from reflection of the emitted laser light by an object to accordingly perform at least measurement of a distance of the object.

The lighting device is comprised of one or more halogen lamps. The lighting device is configured to emit visible light toward the outside of the vehicle for illuminating surroundings of the vehicle.

The combined radar and lighting unit of the third aspect configured set forth above is configured to set the wavelength of the laser light emitted from the laser radar apparatus to be different from a peak wavelength in an emission spectrum of the one or more halogen lamps installed in the vehicle.

The emission spectrum is a distribution of intensities of light at respective different wavelengths. The emission spectrum can be plotted as a graph with the horizontal axis as light wavelength, and the vertical axis as light intensity. Specifically, the peak wavelength, i.e., the wavelength at which the corresponding light intensity is maximum in the emission spectrum, is approximately 900 nanometers.

This configuration of the combined radar and lighting unit makes the wavelength of laser light emitted therefrom different from the peak wavelength of the one or more halogen lamps thereof.

This therefore enables the laser radar apparatus to perform distance measurement with less influence of light emitted from the lighting device on the distanced measurement, making it possible to improve the detection performance of the laser radar apparatus.

The present disclosure provides a combined radar and lighting unit according to a fourth aspect. The combined radar and lighting unit of the fourth aspect includes a laser radar apparatus mounted to a vehicle, and a lighting device mounted to the vehicle.

The laser radar apparatus is configured to emit, toward an outside of the vehicle, laser light having a wavelength of not less than 900 nanometers, and detect reflected light resulting from reflection of the emitted laser light by an object to accordingly perform at least measurement of a distance of the object.

The lighting device is configured to emit first light whose wavelength range is within a visible range, and second light whose wavelength range is outside the visible range. The lighting device is configured to adjust a quantity of the second light to be smaller than the quantity of the first light.

The combined radar and lighting unit of the fourth aspect configured set forth above is configured to set the wavelength of the laser light emitted from the laser radar apparatus to be outside the visible range, and set the quantity of the second light whose wavelength range is outside the visible range to be smaller than the quantity of the first range whose wavelength range is within the visible range.

This configuration of the combined radar and lighting unit enables the laser radar apparatus to perform distance measurement with less influence of the second light emitted from the lighting device on the distanced measurement, making it possible to improve the detection performance of the laser radar apparatus.

The following describes exemplary embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to the accompanying drawings.

Referring to FIG. 1, a combined radar and lighting unit 1 according to the first embodiment, which is installed in a vehicle, includes a headlight, i.e., a headlight assembly, 2, a laser radar apparatus 3, a controller 4, and a housing 5.

The headlight 2 is mounted to the front portion of the vehicle, and is configured to emit visible light in the forward direction of the vehicle. The emitted visible light of the headlight 2 enables the driver's range of view in the forward direction of the vehicle to be ensured when the vehicle is traveling during night-time.

The laser radar apparatus 3 is mounted to the front portion of the vehicle. The laser radar apparatus 3 is configured to emit laser light in the forward direction of the vehicle, and detect reflected light resulting from reflection of the emitted laser light by an object located in front of the vehicle, which will be referred to as a forward object.

Then, the laser radar apparatus 3 is configured to analyze the detected reflected light to thereby detect a distance of the forward object relative to the vehicle.

Specifically, the laser radar apparatus 3 according to the first embodiment is designed as a lidar apparatus configured to output laser light in the forward direction of the vehicle while two-dimensionally scanning the outputted laser light, and detect, based on detected reflected light resulting from reflection of the scanned laser light by a forward object, the position of the forward object. The lidar apparatus, which will be referred to simply as a LIDAR, which stands for Light Detection and Ranging.

The controller 4 is designed as an electronic control unit mainly comprised of a microcomputer that includes a CPU, a ROM, a RAM, and other peripheral devices. The CPU is programmed to run one or more programs stored in a non-transitory storage medium, such as the ROM, to thereby implement various functions of the microcomputer. Execution of the one or more programs by the CPU enables one or more methods based on the one or more programs to be carried out. At least one of the functions to be carried out by the CPU can be implemented by one or more hardware devices, such as one or more IC. A single microcomputer or a plurality of microcomputers can constitute the controller 4.

The housing 5 contains the headlight 2, laser radar apparatus 3, and controller 4.

Figure 2:
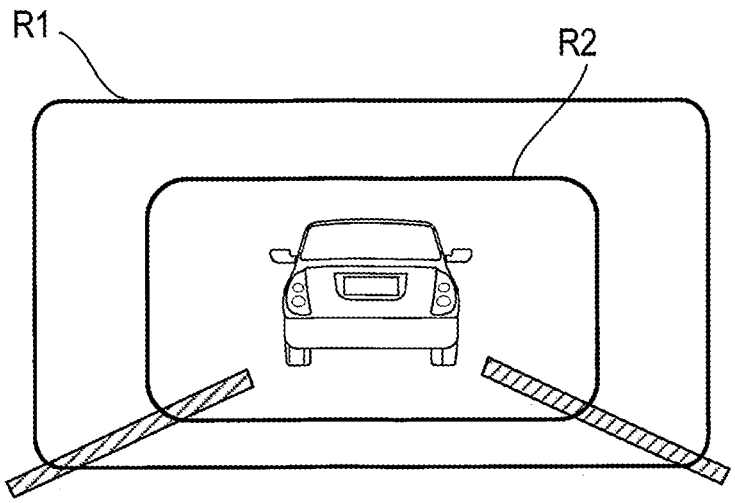
FIG. 2 is a view illustrating an irradiation region of a laser radar apparatus and an irradiation region of a headlight.

FIG. 2 illustrates a region scanned by the forward emitted laser light of the laser radar apparatus 3, which will be referred to as a laser-light irradiation region R1, and a region irradiated by the forward emitted visible light of the headlight 2, which will be referred to as a visible-light irradiation region R2. As illustrated in FIG. 2, the laser-light irradiation region R1 is defined to enclose the visible-light irradiation region R2.

The controller 4 is configured to execute a control routine to thereby control the headlight 2 and the laser radar apparatus 3.

Next, the following describes the instructions of the control routine executed by the controller 4. The controller 4 is programmed to repeatedly execute the control routine while operating.

Figure 3:
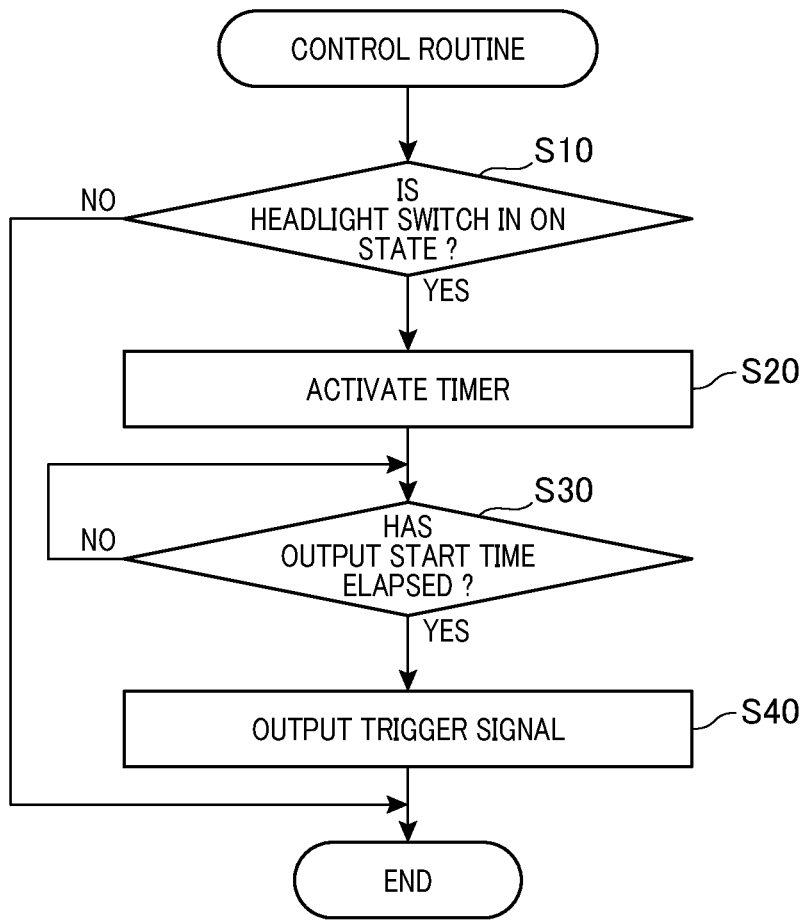
FIG. 3 is flowchart illustrating a control routine.

When starting the control routine, as illustrated in FIG. 3, the controller 4 determines whether a headlight switch is in an on state in step S1. The headlight switch is operatable by a driver of the vehicle. When the headlight switch is switched to be in the on state by the driver, the headlight 2 is configured to irradiate the visible-light irradiation region with the visible light. When the headlight switch is switched to be in an off state by the driver, the headlight 2 is configured to stop irradiation of the visible light.

Upon determining that the headlight switch is in the off state (NO in step S10), the controller 4 terminates the control routine. Otherwise, upon determining that the headlight switch is in the on state (YES in step S10), the controller 4 activates a timer installed in the RAM of the controller 4 in step S20. The timer is configured to increment, by 1, a counter from 0 every, for example, 1 millisecond.

Next, the controller 4 determines whether a predetermined output start time Ts has elapsed since the activation of the timer in step S30. The first embodiment sets the output start time Ts to 1000 milliseconds. Specifically, the controller 4 determines whether a value of the counter of the timer is more than or equal to a threshold value corresponding to the output start time Ts in step S30.

Upon determining that the predetermined output start time Ts has not elapsed yet since the activation of the timer (NO in step S30), the controller 4 repeats the operation in step S30 until the predetermined output start time Ts has elapsed since the activation of the timer.

Otherwise, upon determining that the output start time Ts has elapsed since the activation of the timer (YES in step S30), the controller 4 outputs, to each of the headlight 2 and laser radar apparatus 3, a trigger signal in step S40, and thereafter terminates the control routine.

Figure 4:
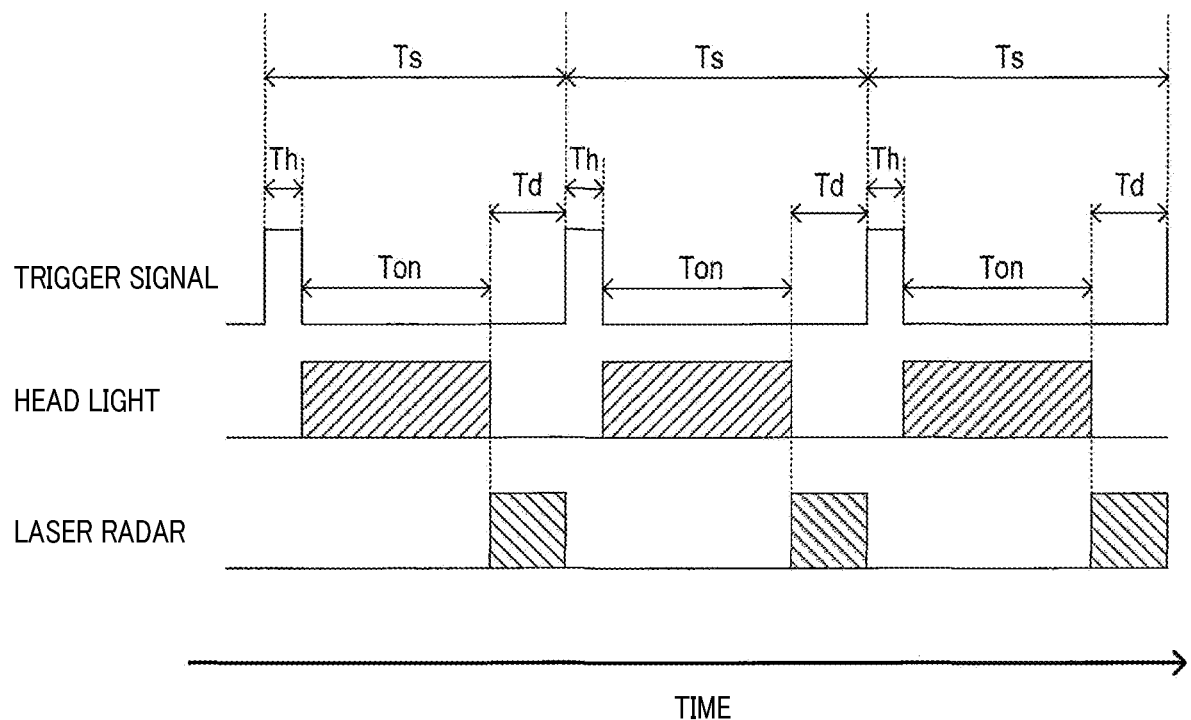
FIG. 4 is a timing chart illustrating how a trigger signal is outputted, how the headlight is operated, and how the laser radar apparatus is operated.
Figure 5:
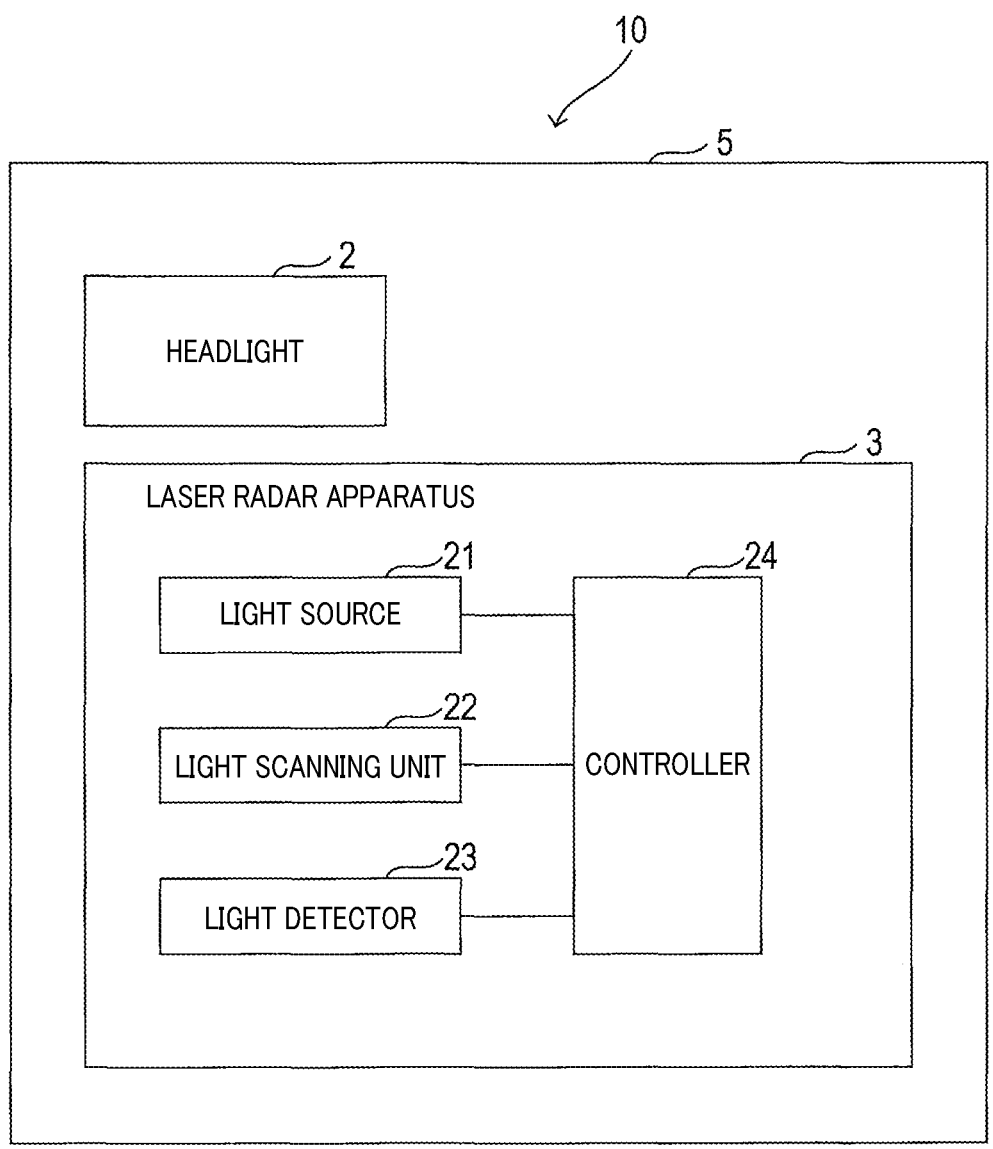
FIG. 5 is a block diagram illustrating a configuration of a combined radar and lighting unit according to the second embodiment.

The trigger signal, as illustrated in FIG. 4, is a pulse signal that has a predetermined high level for a predetermined duration Th, such as 100 milliseconds, and thereafter has a predetermined low level for a predetermined duration. The duration Th will be referred to as a high-level duration Th.

The headlight 2 is configured to perform irradiation, i.e., emission, of the visible light until a predetermined on time Ton, such as 700 milliseconds, has elapsed since change of the trigger signal from the high level to the low level, and stop emission of the visible light after the predetermined on-time Ton has elapsed.

The laser radar apparatus 3 is configured to perform a position detection task when the on time Ton has elapsed since change of the trigger signal from the high level to the low level. The position detection task is configured to emit laser light in the forward direction of the vehicle while scanning the emitted laser light, detect reflected light resulting from reflection of the scanned laser light by a forward object, and analyze the detected reflected light to thereby detect the position of the forward object.

The laser radar apparatus 3 is additionally configured to terminate the position detection task when a predetermined detection time Td, such as 200 milliseconds, has elapsed since the start of the position detection task.

The output start time Ts is deter mined to be longer than or equal to the sum of the high-level duration Th, the on time Ton, and the detection time Td.

The combined radar and lighting unit 1 configured set forth above includes the laser radar apparatus 3, the headlight 2, and the controller 4.

The laser radar apparatus 1, which is mounted to the vehicle, is configured to emit laser light toward an outside of the vehicle, and detect reflected light resulting from reflection of the emitted laser light by an object to accordingly perform measurement of a distance of the object relative to the apparatus 1. The headlight 2, which is mounted to the vehicle, is configured to emit visible light toward the outside of the vehicle for illuminating the surroundings of the vehicle.

The controller 4 is configured to control the headlight 2 to cause the headlight 2 to alternately operate in a first emission mode and a second emission mode. The headlight 2 operates in the first emission mode to perform emission of the visible light, and the headlight 2 operates in the second emission mode to stop emission of the visible light.

The controller 4 is additionally configured to control the laser radar apparatus 3 to 1. Interrupt the measurement of the distance while the headlight 2 is operating in the first emission mode 2. Execute the measurement of the distance while the headlight 2 is operating in the second emission mode As described above, the combined radar and lighting unit 1 is configured to cause the headlight 2 to operate alternately in the first emission mode and the second emission mode. The combined radar and lighting unit 1 is additionally configured to adjust a first duration of the headlight 2 operating in the first emission mode and a second duration of the headlight 2 operating in the second emission mode to accordingly enable the driver's sight toward the direction in which the visible light is emitted to be ensured.

In particular, the combined radar and lighting unit 1 is configured to control the laser radar apparatus 3 to interrupt execution of the measurement of the distance while the headlight 2 is performing emission of the visible light in the first emission mode, and execute the measurement of the distance while the headlight 2 is stopping emission of the visible light in the second emission mode.

This configuration therefore enables the laser radar apparatus 3 to execute measurement of the distance while influence of the visible light irradiated from the headlight 2 is reduced, making it possible to improve the detection performance of the laser radar apparatus 3.

The headlight 2 serves as a lighting device, and the controller 4 serves as a controller.

Second Embodiment

The following describes the second embodiment of the present disclosure with reference to the accompanying drawings. In particular, the following focuses on the points of the second embodiment, which are different from the first embodiment. Reference characters respectively assigned to components of the first embodiment are used to refer to the identical components of the second embodiment, which are substantially identical to the respective components of the first embodiment.

A combined radar and lighting unit 10 according to the second embodiment, which is installed in a vehicle, includes a headlight 2, a laser radar apparatus 3, and a housing 5.

The headlight 2 is comprised of one or more halogen lamps.

The laser radar apparatus 3 includes a light source 21, a light scanning unit 22, a light detector 23, and a controller 24.

The light source 21 is comprised of, for example, a semiconductor laser diode, and is configured to emit laser light that has a predetermined wavelength band of, for example, 900 nanometers. The light scanning unit 22 is configured to output the laser light emitted from the light source 21 toward the outside of the laser radar apparatus 3 while two-dimensionally scanning the emitted laser light.

The light detector 23 is configured to detect reflected light arriving at the laser radar apparatus 3.

The controller 24 is configured to detect a current direction of the laser light scanned by the light scanning unit 22, and to control, based on the detected current direction of the laser light, how the light scanning unit 23 performs the two-dimensional scanning of the laser light.

Additionally, the controller 24 is configured to calculate the difference between an emission time of each laser light emitted from the light source 21 and a detection time of corresponding reflected light being detected by the light detector 23 to thereby measure a distance of a target object relative to the laser radar apparatus 3 for each laser light; the target object reflects the corresponding laser light to generate the corresponding reflected light arriving at the light detector 23.

The controller 24 is designed as an electronic control unit mainly comprised of a microcomputer that includes a CPU, a ROM, a RAM, and other peripheral devices. The CPU is programmed to run one or more programs stored in a non-transitory storage medium, such as the ROM, to thereby implement various functions of the microcomputer. Execution of the one or more programs by the CPU enables one or more methods based on the one or more programs to be carried out. At least one of the functions to be carried out by the CPU can be implemented by one or more hardware devices, such as one or more IC. A single microcomputer or a plurality of microcomputers can constitute the controller 24.

The housing 5 has stored the headlight 2 and laser radar apparatus 3.

Figure 6:
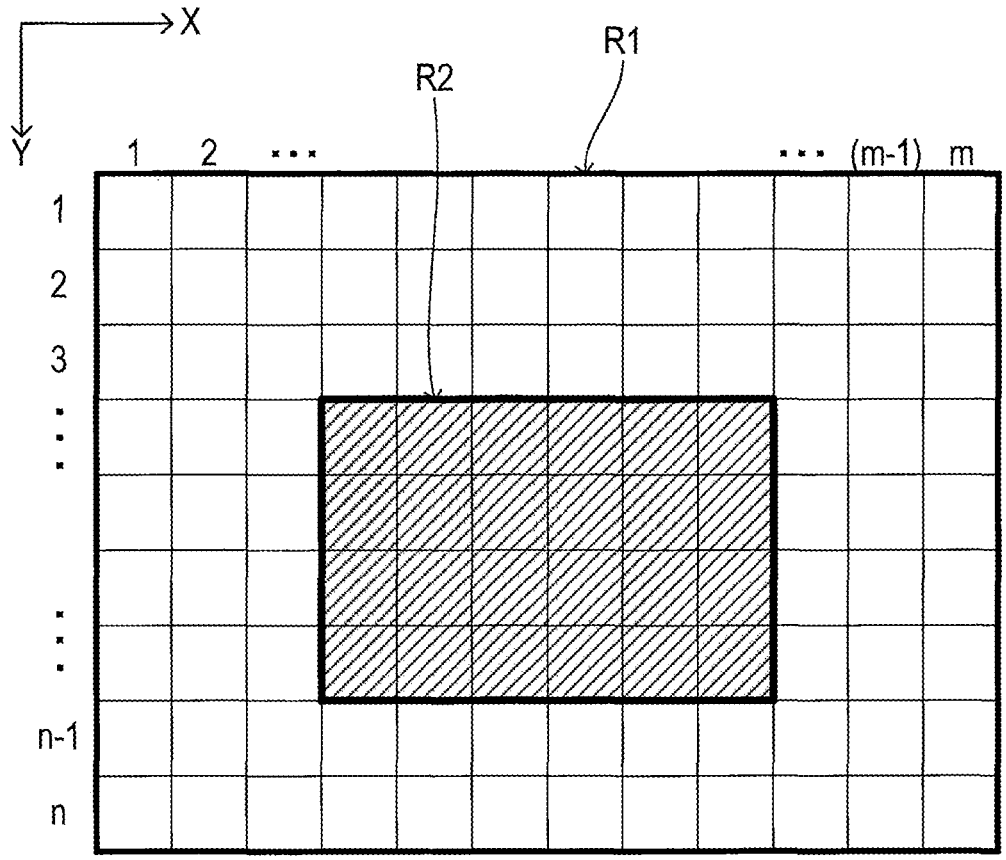
FIG. 6 is a view illustrating a plurality of segments in the irradiation region.

FIG. 6 illustrates a laser-light irradiation region R1 scanned by the forward emitted laser light of the laser radar apparatus 3.

As illustrated in FIG. 6, the laser-light irradiation region R1 is comprised of rectangular segments two-dimensionally arranged in both the width direction of the vehicle, which corresponds to an X-axis direction, and the vertical direction perpendicular to the vehicle width direction, which corresponds to a Y-axis direction. The two-dimensionally arranged segments form a matrix of (m×n) segments; m, which is a positive integer, represents the number of segments in the X-axis direction, and n, which is a positive integer, represents the number of segments in the Y-axis direction.

The combined radar and lighting unit 10 is configured such that

1. A visible-light irradiation region R2 irradiated by the forward emitted visible light of the headlight 2 is overlapped with a range in the (m×n) segments of the laser-light irradiation region R1

2. The range in the (m×n) segments of the laser-light irradiation region R1, with which the visible-light irradiation region R2 is overlapped, is previously set as an overlap range The controller 24 of the laser radar apparatus 3 is configured to perform a threshold setting routine that sets a detection threshold for detection of objects.

Next, the following describes the instructions of the threshold setting routine executed by the controller 24. The controller 24 is programmed to repeatedly execute the threshold setting routine while the laser radar apparatus 3 is operating.

Figure 7:
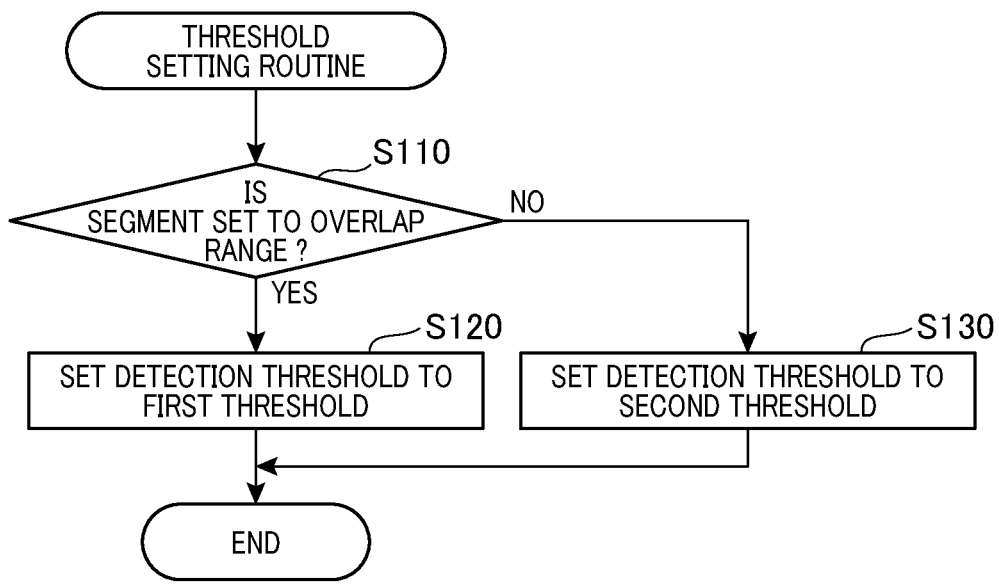
FIG. 7 is a flowchart illustrating a threshold setting routine.
Figure 8:
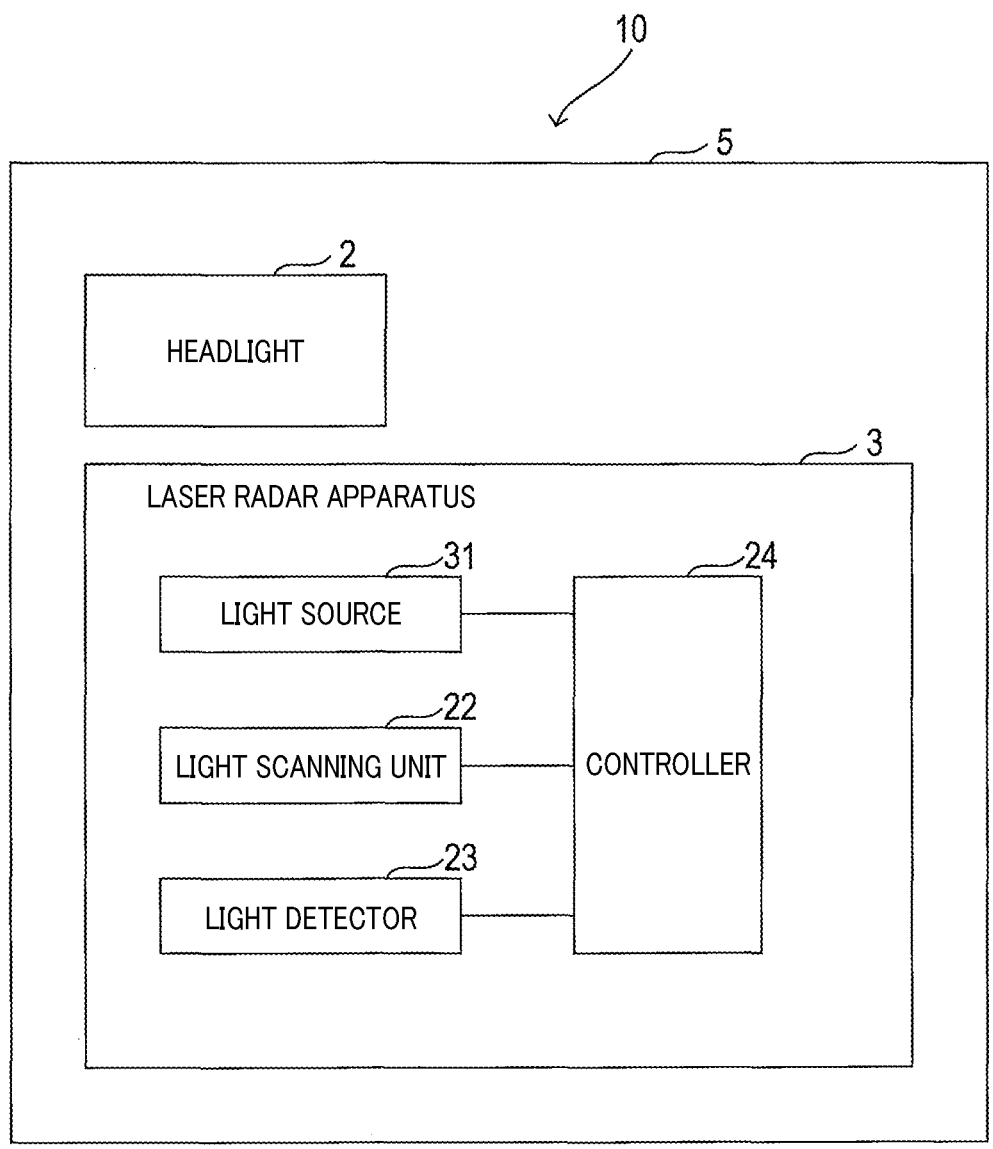
FIG. 8 is a block diagram illustrating a configuration of a combined radar and lighting unit according to the third embodiment.
Figure 9:
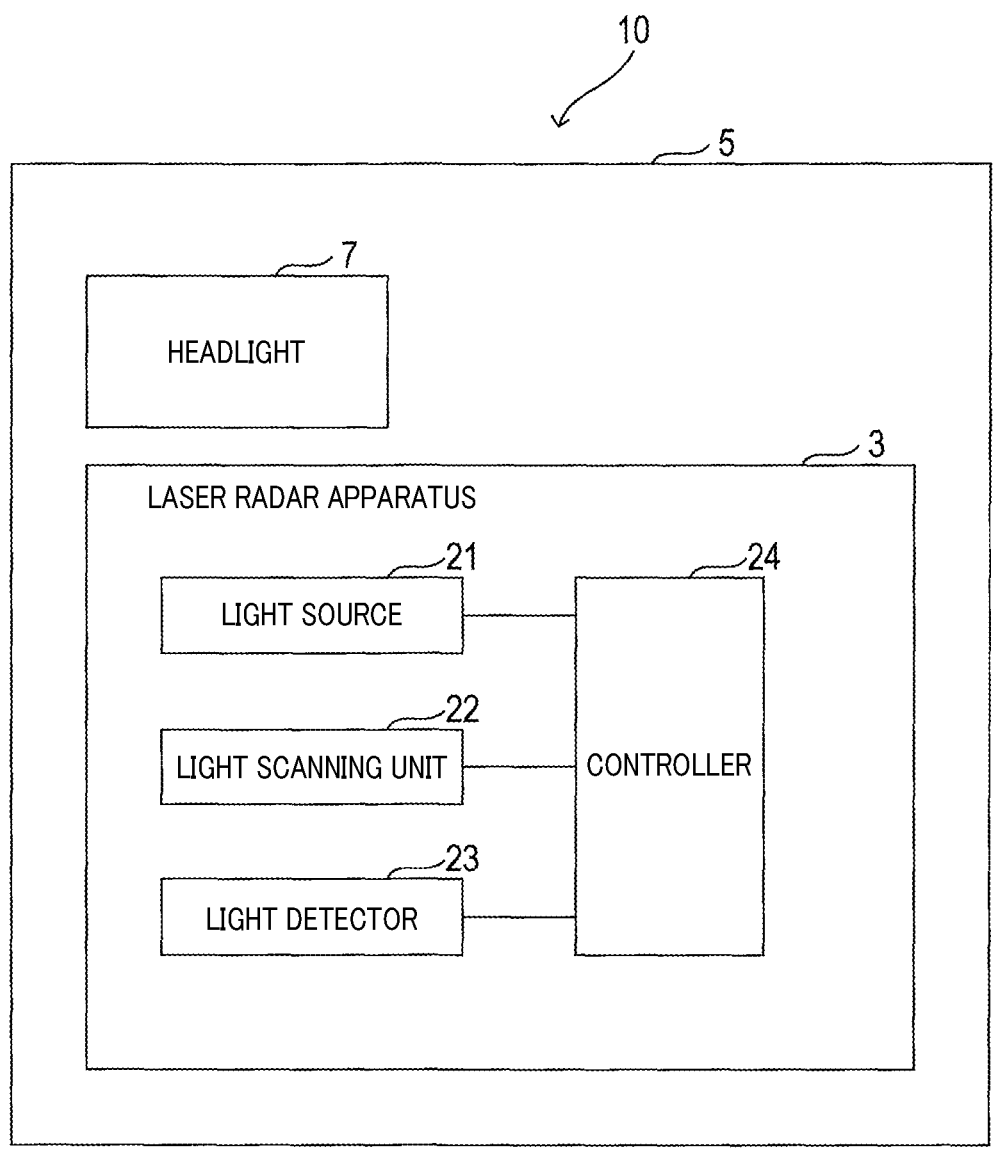
FIG. 9 is a block diagram illustrating a configuration of a combined radar and lighting unit according to the fourth embodiment.

When starting the threshold setting routine, the controller 24, as illustrated in FIG. 7, determines whether at least one segment in the laser-light irradiation region R1, toward which the laser light currently scanned by the light scanning unit 22 is directed, is set to the overlap range in step S110. The controller 24 of the combined radar and lighting unit 10 is configured to store a correspondence relationship between each of the directions of the laser light scanned by the light scanning unit 22 and a corresponding at least one of the segments of the laser-light irradiation region R1. This enables the controller 24 to detect the direction of the laser light currently scanned by the light scanning unit 22 to thereby identify at least one segment in the laser-light irradiation region R1, toward which the currently scanned laser light is directed.

Upon determination that at least one segment in the laser-light irradiation region R1, toward which the laser light currently scanned by the light scanning unit 22 is directed, is set to the overlap range (YES in step S110), the controller 24 sets the detection threshold to a predetermined first threshold in step S120, and thereafter terminates the threshold setting routine.

Otherwise, upon determination that at least one segment in the laser-light irradiation region R1, toward which the laser light currently scanned by the light scanning unit 22 is directed, is not set to the overlap range (NO in step S110), the controller 24 sets the detection threshold to a predetermined second threshold in step S130, and thereafter terminates the threshold setting routine.

In particular, the controller 24 determines whether the intensity of reflected light detected by the light detector 23 is larger than the first threshold or the second threshold set as the detection threshold; the first threshold is set to be higher than the second threshold.

Upon determination that the intensity of the reflected light detected by the light detector 23 is higher than the first threshold or the second threshold set as the detection threshold, the controller 24 deter mines that an object that reflected the scanned laser light is detected.

The laser radar apparatus 3 configured set forth above includes the light scanning unit 22, light detector 23, and controller 24.

The light scanning unit 22, which is mounted to the vehicle, is configured to output laser light toward the outside of the vehicle while scanning the laser light.

The light detector 23 is configured to perform detection of reflected light.

The controller 24 is configured to measure, based on information resulting from the detection of the reflected light, at least a distance to an object that reflected at least the scanned laser light relative to the laser radar apparatus 3 upon determination that the object that reflected the scanned laser light is detected based on a detection threshold.

The headlight 2, which is mounted to the front portion of the vehicle, is configured to emit visible light toward the outside of the vehicle for illuminating the surroundings of the vehicle.

The controller 24 is configured to determine whether at least one segment in the laser-light irradiation region R1, which is irradiated by the laser light currently scanned by the light scanning unit 22, is overlapped with the visible-light irradiation region R2 irradiated by the emitted visible light of the headlight 2.

When determining that the at least one segment in the laser-light irradiation region R1, which is irradiated by the laser light currently scanned by the light scanning unit 22, is overlapped with the visible-light irradiation region R2, the controller 24 is configured to set the detection threshold to be higher than when determining that the at least one segment in the laser-light irradiation region R1, which is irradiated by the laser light currently scanned by the light scanning unit 22, is not overlapped with the visible-light irradiation region R2.

As described above, the laser radar apparatus 3 is configured to

1. Set the detection threshold to be higher upon determination that there is a high possibility that the laser radar apparatus 3 detects reflected visible light resulting from reflection of the visible light emitted from the apparatus 3 by an object 2. Set the detection threshold to be lower upon determination that there is a low possibility that the laser radar apparatus 3 detects reflected visible light resulting from reflection of the visible light emitted from the apparatus 3 by an object This configuration therefore reduces a risk that the laser radar apparatus 3 may determine, when detecting reflected visible light resulting from reflection of the emitted visible light by an object, the object as a target object that reflected the emitted laser light. This therefore results in improvement of the object detection ability of the laser radar apparatus 3.

In the above second embodiment, the controller 24 includes a measuring unit, serves as a region determiner to perform the operation in step S110, and serves as a threshold setter to perform the operation in step S120.

Third Embodiment

The following describes the third embodiment of the present disclosure with reference to the accompanying drawings. In particular, the following focuses on the points of the third embodiment, which are different from the second embodiment. Reference characters respectively assigned to components of the second embodiment are used to refer to the identical components of the third embodiment which are substantially identical to the respective components of the second embodiment.

A combined radar and lighting unit 10 according to the third embodiment includes a light source 31 in place of the light source 21. Additionally, the controller 24 of the combined radar and lighting unit 10 according to the third embodiment is configured not to execute the threshold setting routine, which is different from the controller 24 of the second embodiment.

The light source 31 is comprised of, for example, a semiconductor laser diode, and is configured to emit laser light that has a predetermined wavelength of not less than 1000 nanometers. The upper limit of the wavelength of the laser light emitted from the light source 31 represents the upper limit of the wavelength of reflected light detectable by the light detector 23.

The combined radar and lighting unit 10 as described above is comprised of the laser radar apparatus 3 and the headlight 2, and the headlight 2 is comprised of one or more halogen lamps. Laser light emitted from the laser radar apparatus 3 has a predetermined wavelength of not less than 1000 nanometers.

The combined radar and lighting unit 10 configured set forth above is configured to set the wavelength of laser light emitted from the laser radar apparatus 3 to be different from a peak wavelength in an emission spectrum of the one or more halogen lamps installed in the vehicle. Such an emission spectrum is a distribution of intensities of light at respective different wavelengths. For example, such an emission spectrum can be plotted as a graph with the horizontal axis as light wavelength, and the vertical axis as light intensity. Specifically, the peak wavelength, i.e., the wavelength at which the corresponding light intensity is maximum in the emission spectrum, is approximately 900 nanometers.

This configuration of the combined radar and lighting unit 10 makes the wavelength of laser light emitted therefrom different from the peak wavelength of the one or more halogen lamps thereof. This therefore enables the laser radar apparatus 3 to perform distance measurement with smaller influence of light emitted from the headlight 2 on the distanced measurement, making it possible to improve the detection performance of the laser radar apparatus 3.

Fourth Embodiment

The following describes the fourth embodiment of the present disclosure with reference to the accompanying drawings. In particular, the following focuses on the points of the fourth embodiment, which are different from the second embodiment. Reference characters respectively assigned to components of the second embodiment are used to refer to the identical components of the fourth embodiment, which are substantially identical to the respective components of the second embodiment.

A combined radar and lighting unit 10 according to the fourth embodiment includes a headlight 7 in place of the headlight 2. Additionally, the controller 24 of the combined radar and lighting unit 10 according to the fourth embodiment is configured not to execute the threshold setting routine, which is different from the controller 24 of the second embodiment.

The headlight 7 is comprised of, for example, one or more high-intensity discharge lamps or one or more light-emitting diode lights, each of which emits first light whose wavelength range is within a visible range, and emits second light whose wavelength range is outside the visible range; the quantity of the second light is smaller than the quantity of the first light.

Such a high-intensity discharge lamp is also be referred to as an HID lamp. That is, HID stands for High-Intensity Discharge. LED stands for Light Emitting Diode.

The laser lighting unit 10 as described above is comprised of the laser radar apparatus 3 and the headlight 7, and the headlight 7 is configured to 1. Emit the first light whose wavelength range is within the visible range, and the second light whose wavelength range is outside the visible range 2. Adjust the quantity of the second light to be smaller than the quantity of the first light Laser light emitted from the laser radar apparatus 3 has a predetermined wavelength of not less than 900 nanometers.

The combined radar and lighting unit 10 configured set forth above is configured to set the wavelength of laser light emitted from the laser radar apparatus 3 to be outside the visible range, and set the quantity of the second light whose wavelength range is outside the visible range to be smaller than the quantity of the first range whose wavelength range is within the visible range.

This configuration of the combined radar and lighting unit 10 enables the laser radar apparatus 3 to perform distance measurement with smaller influence of the second light emitted from the headlight 7 on the distanced measurement, making it possible to improve the detection performance of the laser radar apparatus 3.

The headlight 7 according to the fourth embodiment serves as a lighting device.

The embodiments of the present disclosure have been described, but the present disclosure is not limited to the embodiments, and can be implemented with various modifications.

First Modification

For example, the first embodiment, which causes the headlight 2 to stop emission of the visible light in the second emission mode, can be modified to cause the headlight 2 to reduce the quantity of the emitted visible light in the second emission mode to be lower than that in the first emission mode.

Second Modification

The controller 4 of the first embodiment is configured to output the trigger signal to both the headlight 2 and the laser radar apparatus 3, but the first embodiment can be modified such that the headlight 2 notifies the laser radar apparatus 3 of information about the headlight 2 stopping emission of the visible light or reducing the quantity of the visible light. The first embodiment can also be modified such that the laser radar apparatus 30 notifies the headlight 2 of information about the termination of its distance measurement.

Third Modification

The second embodiment sets a range in the segments of the laser-light irradiation region R1, with which the visible-light irradiation region R2 is overlapped, as the overlap range. The second embodiment can be modified to change a location of the overlap range in the segments of the laser-light irradiation region R1 in accordance with change of a high beam of the light emitted from the headlight 2 and a low beam of the light emitted from the headlight 2.

The functions of one element in each embodiment can be distributed as plural elements, and the functions that plural elements have can be combined into one element. At least part of the structure of each embodiment can be eliminated. At least part of each embodiment can be added to the structure of another embodiment, or can be replaced with a corresponding part of another embodiment.

The present disclosure can be implemented by various embodiments in addition to the combined radar and lighting units 1, 10 and the laser radar apparatus 3; the various embodiments include systems each include the combined radar and lighting unit 1 or 10 and the laser radar apparatus 3, programs for causing a computer to serve as the combined radar and lighting unit 1 or 10 or the laser radar apparatus 3, storage media storing the programs, and control methods.

What is claimed is:

1. A combined radar and lighting unit comprising:
   a laser radar apparatus mounted to a vehicle and configured to:
     emit laser light toward an outside of the vehicle; and
     detect reflected light resulting from reflection of the emitted laser light by an object to accordingly perform at least measurement of a distance of the object;
   a lighting device mounted to the vehicle and configured to emit visible light toward the outside of the vehicle for illuminating surroundings of the vehicle; and
   a controller configured to:
     control the lighting device to cause the lighting device to alternately operate in a first emission mode to perform emission of the visible light, and in a second emission mode to stop emission of the visible light or reduce a quantity of the visible light; and
     control the laser radar apparatus to:
       interrupt the measurement of the distance while the lighting device is operating in the first emission mode;
       execute the measurement of the distance while the lighting device is operating in the second emission mode;
       detect a turn-on of a switch for the lighting device;
       determine whether a predetermined output start time has elapsed since detection of the turn-on of the switch for the lighting device;
       wait for a lapse of a high-level period of a predetermined trigger signal in response to determination that the predetermined output start time has elapsed since detection of the turn-on of the switch for the lighting device; and
       cause, in the first emission mode, the lighting device to emit the visible light after the lapse of the high-level period of the predetermined trigger signal.

2. The combined radar and lighting unit according to claim 1, wherein:

the controller is configured to adjust a first duration of the lighting device operating in the first emission mode and a second duration of the lighting device operating in the second emission mode to accordingly enable a driver's sight toward a direction in which the visible light is emitted from the lighting device to be ensured.

3. A combined radar and lighting unit comprising:

a laser radar apparatus mounted to a vehicle and configured to:

emit laser light toward an outside of the vehicle; and detect reflected light resulting from reflection of the emitted laser light by an object to accordingly perform at least measurement of a distance of the object;

a lighting device mounted to the vehicle and configured to emit visible light toward the outside of the vehicle for illuminating surroundings of the vehicle; and a controller configured to:

control the lighting device to cause the lighting device to alternately operate in a first emission mode to perform emission of the visible light, and in a second emission mode to stop emission of the visible light or reduce a quantity of the visible light; and control the laser radar apparatus to:

interrupt the measurement of the distance while the lighting device is operating in the first emission mode;

execute the measurement of the distance while the lighting device is operating in the second emission mode;

output a common trigger signal for both the laser radar apparatus and the lighting device, the common trigger signal having a high level and a low level;

interrupt both the measurement of the distance and emission of the visible light during a high-level duration of the high level of the common trigger signal;

cause, in the first emission mode, the lighting device to emit the visible light during a first time of the low level of the common trigger signal after lapse of the high-level duration of the high level of the common trigger signal, the first time corresponding to the first duration; and cause, in the second emission mode, the laser apparatus to execute the measurement of the distance during a remaining second time of the low level of the common trigger signal after lapse of the first time of the low level of the common trigger signal, the second time corresponding to the second duration.

* * * * *